Dec. 22, 1964  B. RAGLAND ETAL  3,162,364
SLIDE RULE TYPE SELECTOR

Filed May 14, 1963  2 Sheets-Sheet 1

FIG. 7

| 20 | 40 | 60 | 80 | 100 |
|---|---|---|---|---|
| 54-723 | 84-723 | 112-723 | 138-723 | |
| 63-654 | 91-654 | 126-654 | 153-654 | |
| 72-572 | 105-572 | 140-572 | 176-572 | |
| 84-485 | 126-485 | 165-485 | 207-485 | |
| 112-362 | 168-362 | 220-362 | 276-362 | |

FIG. 8

|  | 1.4 | 1.6 | 1.8 | 2.0 | 2.2 | 2.4 | 2.6 | 2.8 | 3.0 |  |
|---|---|---|---|---|---|---|---|---|---|---|
|  | .55 | .60 | .65 | .70 |  | .80 |  | .90 |  | 1.0  1.1 |
|  | 5 | 7 | 10 | 13 | 17 |
|  | 40 | 52 | 59 | 65 | 72 |
|  | 78 | 84 | 88 | 91 | 93 |
|  | 96 | 97 | 98 | 99 | 99 |
|  | 98 | 99 | 99 | 99 | 99 |
| .7 | .8 | .9 | 1.0 | 1.1 |  |
|  | 91 | 92 | 93 | 93 | 94 |
|  | 83 | 85 | 86 | 87 | 88 |
|  | 75 | 78 | 80 | 82 | 82 |
|  | 68 | 71 | 74 | 76 | 76 |
|  | 60 | 64 | 67 | 69 | 70 |

INVENTORS
BENJAMIN RAGLAND
GEORGE C. PATTERSON
BY
JOHN E. McRAE

Dec. 22, 1964 B. RAGLAND ETAL 3,162,364
SLIDE RULE TYPE SELECTOR
Filed May 14, 1963 2 Sheets-Sheet 2

INVENTORS
BENJAMIN RAGLAND
GEORGE C. PATTERSON
BY
JOHN E. McRAE

United States Patent Office 3,162,364
Patented Dec. 22, 1964

3,162,364
SLIDE RULE TYPE SELECTOR
Benjamin Ragland, Birmingham, and George C. Patterson, Dearborn, Mich., assignors to American Radiator & Standard Sanitary Corporation, New York, N.Y., a corporation of Delaware
Filed May 14, 1963, Ser. No. 280,392
5 Claims. (Cl. 235—89)

This invention relates to a dust collector selector comprising a slide rule instrument having an elongated holder and a series of interchangeable dust collector selection cards. The cards are each provided with suitable printed information thereon so that when a selected card is inserted into the holder the user can predict the size collector necessary to handle a given gas volume with a given dust-collecting efficiency.

In the dust collection field the dust collector size is determined in part by such factors as volume of gas to be cleaned per given time interval, expected gas temperature, allowable pressure drop through the collector, elevation of the plant site (barometric pressure), specific gravity of the dust, particle size distribution of the dust, and minimum permissible collection efficiency.

Under usual practice this data is supplied to the dust collector manufacturer, and he then makes numerous calculations to arrive at the collector which can be expected to give the required collection efficiency. In most cases the calculations require a considerable period of time, with consequent cost and inconvenience to the dust collector manufacturer and customer.

It is the principal object of the present invention to provide a slide rule type instrument having an arrangement of interchangeable printed informational cards which allow the user of the instrument to rapidly ascertain the types and sizes of collector necessary to meet different given operating conditions (such as volume of gas to be cleaned, operating temperature, allowable pressure drop, elevation of the plant site, specific gravity of the dust, and expected collection efficiency).

A further object is to provide an instrument of the above type which is adapted to handle insert cards for each of various different dust collectors, as for example centrifugal collectors, cyclone collectors and electrical collectors.

Other objects of this invention will appear from the following description and appended claims, reference being had to the accompanying drawings forming a part of this specification wherein like reference characters designate corresponding parts in the several views.

In the drawings:

FIG. 7 is a front view of an insert card employed in the FIG. 4 instrument;

FIG. 8 is a rear view of the FIG. 7 card; and

Conventional Practice

Figure 1:
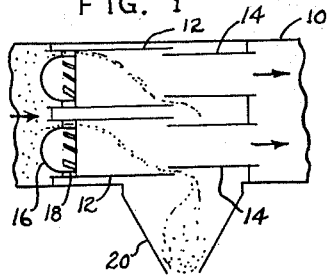
FIGURES 1, 2 and 3 are schematic views illustrating the main features of three conventional dust collectors now in common use.

In the drawings FIG. 1 shows schematically a conventional centrifugal dust collector comprising a main collector housing 10 having a series of horizontal dusty gas inlet tubes 12 and clean gas outlet tubes 14. Each inlet tube is provided with a bullet-nosed frontal wall 16 and obliquely radiating spinner vanes 18 which give the dusty gas a swirling motion as it passes toward the outlet tube under the influence of a fan (not shown). The relatively heavy dust gas particles are centrifugally thrown toward the inner surface of each tube 12 and discharged into hopper 20, while the relatively light clean gas is discharged through each tube 14. In practice a given collector might contain any number of tubes, for example as little as thirty or as many as several hundred, depending on the flow to be handled.

Figure 2:
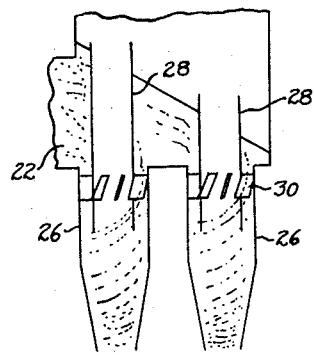

FIG. 2 shows schematically another conventional centrifugal dust collector comprising a dusty gas plenum chamber 22 which feeds gas to the vertically disposed inlet tubes 26. Within each tube 26 there is located a clean gas outlet tube 28 and spinner vanes 30. The relatively light clean gas is drawn upwardly through tubes 28, and the relatively heavy dust particles are exhausted downwardly through the inlet tubes 26 to a hopper (not shown). This collector is built to include different numbers of tubes, as for example as little as three or as many as several hundred. The tube diameter can vary, as for example from about eight inches to about twenty-four inches.

Figure 3:
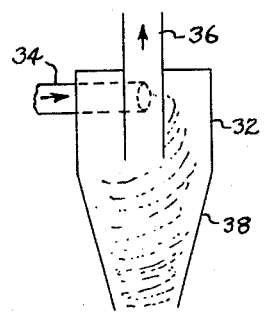

FIG. 3 schematically shows a conventional cyclone dust collector comprising a cylindrical gas chamber 32 having a tangential dusty gas inlet tube 34 and an axial clean gas outlet tube 36. In operation, the heavier dust particles are discharged downwardly through the horifrusto-conical duct 38.

In each of the illustrative collectors we can handle a given volume of gas either by flowing the gas rapidly through a small number of collector tubes or by flowing the gas slowly through a large number of tubes. If the gas is relatively hot, as for example 700° F., its density will be relatively low and less pressure will be required to draw a given volume of gas through the collector than would be the case with a relatively cool gas. Assuming a given permissible pressure drop (as specified by the plant operator), with high temperature gas we can use a relatively small number of tubes and safely operate at a high gas flow rate through each tube, all without exceeding the permissible pressure drop. Assuming the same permissible pressure drop with low temperature gas, we require a larger number of tubes; the volumetric flow rate through each tube is then relatively low. Since the flow resistance offered by a collector is a function of its particular design it is usual practice for the engineer to have available graphs or tables which give the resistance (pressure drop) of his collectors for various volumetric flows and various operating temperatures and barometric pressure conditions. It is an object of the present invention to provide a slide rule instrument which can be used to automatically arrive at the voluminous information heretofore available only from graphs, tables and special calculations. The slide rule instrument is preferably designed for use by salesman in the field, to permit them to give rapid quotations on dust collecting equipment.

With any given volumetric flow it is possible to obtain various different collection efficiencies, depending on such variables as the viscosity of the gas and the specific gravity and particle size of the dust. In general the collection efficiency is directly proportional to the dust specific gravity and particle size, and inversely proportional to the gas viscosity.

In the usual situation the dust has a non-uniform particle size characteristic. For example, a certain fraction of the dust might be in the less-than-10 micron range, and another fraction might be in the less-than-30 micron range. It is conventional therefore to compute the collection efficiencies for the different fractions separately.

One object of the present invention is to provide a slide rule instrument which includes means for correlating values of dust specific gravity, particle size, and gas viscosity (which define dust particle terminal velocity) to make same readily usable in predicting collection efficiencies. Another object is to provide this correlation so that it is usable with various selected volumetric flows and dust particle size distributions.

The Invention

Figure 4:
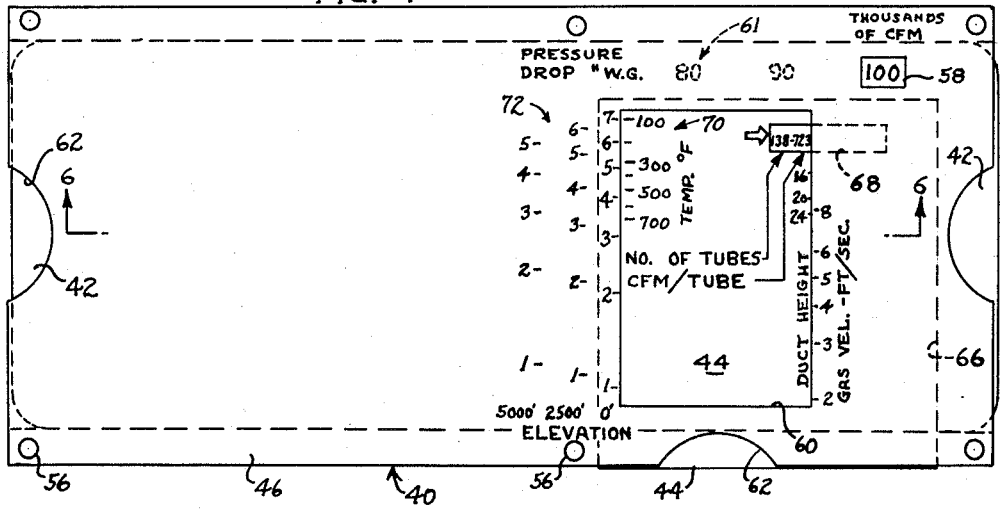
FIG. 4 is a front view of a slide rule instrument constituting one embodiment of the present invention.
Figure 5:
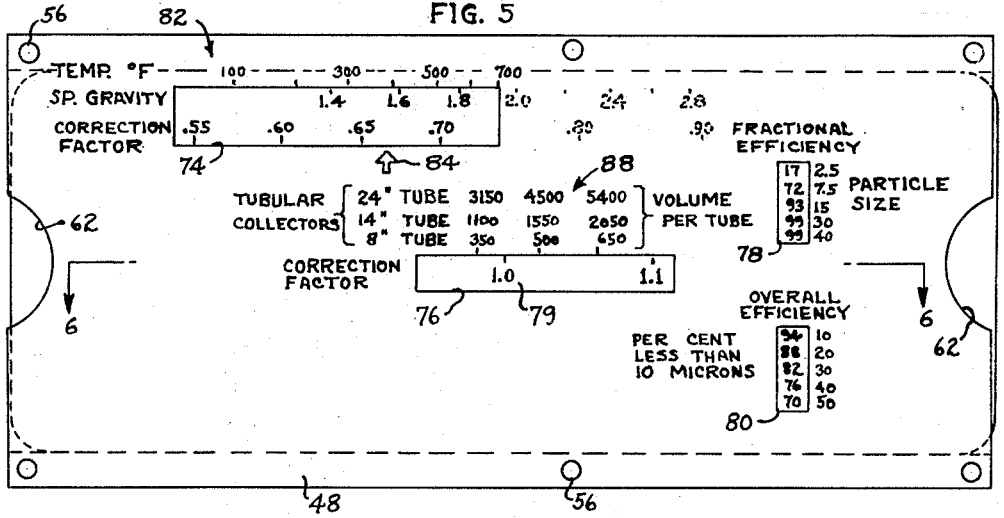
FIG. 5 is a rear view of the FIG. 4 instrument.
Figure 6:
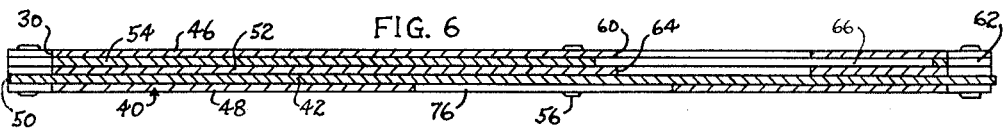
FIG. 6 is a sectional view taken on lines 6—6 in FIGS. 4 and 5.

Referring in greater detail to FIGS. 4 through 6 of the drawings, there is shown a slide rule type instrument comprising a holder 40 and two slidable card-like inserts 42 and 44. Insert 42 may be considered the main insert card, and insert 44 may be considered the auxiliary insert card. For purposes of illustrating the holder structure insert card 44 has been omitted from FIG. 6.

Holder 40 comprises a plate-like front wall 46, a plate-like back wall 48, and three intervening plate-like walls 50, 52 and 54, all preferably secured together by means of adhesive and/or rivets 56.

Collector Size Determination

The collector size is determined as a function of expected gas temperature, expected volumetric gas flow, and expected pressure drop through the collector. In the illustrated instrument the gas temperature reference graduations are printed on card 44, the gas flow graduations are printed on card 42, the pressure drop graduations are printed on the front wall of holder 40, and the collector size identities are printed in columnar form on card 42. By adjusting the two insert cards in the holder we can automatically read out the collector size through window 68 on card 44.

Referring more specifically to FIG. 4, front wall 46 of the holder is provided with a gas volume indicator window 58 and a large rectangular cut-away area 60; will 52 has a cut-away area 64 corresponding in size to cut-away area 60, thus permitting a view of the numerals on card 52. Semi-circular cut-outs 62 are provided in the five walls 46, 48, 50, 52 and 54 for enabling cards 42 and 44 to be moved into and out of the holder.

As best shown in FIG. 6, wall 54 is provided with a cut-away area 66 which is larger than the two registering cut-away areas 60 and 64 in walls 46 and 52. Cut-away area 66 thus forms a slideway for receiving the insert card 44. The outline of this insert card is shown in dotted lines in FIG. 4.

Extending through card 44 is an elongated "collector size" window 68. In its FIG. 4 position part of the window is viewable through the cut-away area 60 for viewing information on the front face of card 42; part of window 68 is masked by wall 46. The information which appears in window 68 is determined both by the position of card 42 and the position of card 44.

As shown in FIGS. 4 and 7, card 42 is provided along one of its longitudinal edges with a scale of numerals 61 denoting gas volume flow rates in thousands of cubic feet per minute. In its illustrated FIG. 4 position the card is set for 100,000 cubic feet per minute flow. By sliding the card rightward we can adjust it for different flow settings, as for example 90,000 cu. ft. per minute, or 45,000 cu. ft. per minute, or 20,000 cu. ft. per minute, according the the distance we move the card.

As shown in FIG. 4, the front face of card 44 is provided with a scale of temperature graduations which we have designated generally by the numeral 70. Scale 70 on card 44 registers with a scale of pressure drop graduations on the front face of holder wall 46. For identification purposes we have applied numeral 72 to this pressure drop scale. The effect of pressure drop on the performance is a function of the barometric pressure (plant site elevation), and accordingly the pressure drop scale comprises three columns, one for each of three different plant site elevations.

In using the slide rule card 44 is adjusted so that the expected temperature of the gas being handled by the collector registers with the allowable pressure drop on scale 72. With card 42 adjusted longitudinally to the desired flow setting in window 58 and card 44 adjusted transversely to the selected temperature-pressure drop setting it is possible to read the collector size through the exposed part of window 68.

In the illustrated apparatus the collector sizes are arranged on card 42 in columnar form, two rows of numbers to each column. The first number in each row denotes the number of collector tubes, and the second number denotes the gas volume handled by each tube. The columns shown in FIG. 7 are illustrative, and in practice additional columns are provided on card 42. As the instrument is set in FIG. 4, a 100,000 cu. ft. per minute gas volume can be handled by 138 dust collector tubes, each having a capacity of approximately 723 cu. ft. per minute. This information is used in conjunction with printed information on the rear face of the instrument to predict the collector efficiency of the selected collector.

Collection Efficiency Determination

As previously noted, the collection efficiency is a function of the collector design, dust specific gravity, gas viscosity, gas velocity, and dust particle size. In correlating these variables together we have designed the illustrated instrument so that gas temperature graduations (which are a measure of the gas viscosity) are printed on the rear face of card 42 in locations to be correlated with dust specific gravity graduations on the rear face of the holder; from this correlation we can read a dimensionless correction factor from an appropriate scale on card 42.

A second correction factor scale is arranged on card 42 to register with a collector capacity scale on the holder rear face. Cooperating with these two scales is a scale of research-established collector efficiency values. This scale of collector efficiency values is printed on card 42 so that the correct expected efficiency appears in a suitable read-out window on holder 40 when card 42 is appropriately adjusted in the holder.

Referring more specifically to FIG. 5 of the drawings, rear wall 48 of the holder is provided with an elongated "collection factor determination" window 74, a "collection factor-collector capacity comparison" window 76, and two "collector efficiency determination" windows 78 and 80. These four windows permit information on the rear face of card 42 to be viewed therethrough.

As shown in FIG. 8 the rear face of card 42 is printed with a dust specific gravity scale 75, a first correction factor scale 77, a second correction factor scale 79, and two collector efficiency scales 81 and 83. In practice the number of figures in each of scales 81 and 83 is greater than shown in illustrative FIG. 8.

In using the instrument card 42 is adjusted so that the specific gravity of the plant dust (scale 75) registers with the anticipated gas temperature on scale 82 (FIG. 5). Assuming for example that the expected dust specific gravity is 1.75 and the expected gas temperature is 400°, then by reading reference arrow 84 the appropriate "correction factor" is determined as .70. By then adjusting card 42 so that this correction factor on scale 79 registers with the appropriate gas volume value on scale 88 we are able to read the expected collector efficiencies in windows 78 and 80. In the illustrated instrument interpolation between efficiency readings is required if the determined correction factor is other than an even number of tenths. If the instrument were made larger such interpolation could be avoided.

As is apparent from FIG. 5, window 78 gives the expected collector efficiency on different particle size dusts, while window 80 gives the over-all expected efficiency for various different particle size distribution dusts. In the FIG. 5 adjusted position of card 12 the expected over-all efficiency when the gas contains less than 10 percent of minus 10 micron size particles is 94. If the dust were to contain 50 percent of minus 10 micron size particles the collection efficiency would drop to 70. It will be understood that FIG. 5 shows card 42 in one only of its adjusted positions, and that manipulations of the card are required to first determine the correction factor and then determine the efficiency.

The illustrated dust collector selector is intended to accept card 42 for each of several different types of collectors, including cyclone collectors, centrifugal collectors, and electrical collectors. In this connection it will be noted that the variables relating to collector design are on card 42, while the variables relating to plant conditions are on holder 40 and card 44. Thus, the holder and element 44 can accept various different collector type cards 42. The illustrated card 42 is for centrifugal collectors of the type shown in FIG. 1. In the case of electrical collectors the temperature-pressure drop graduations on scales 70 and 72 are not appropriate, and accordingly the instrument is provided with suitable gas velocity-duct height graduations as shown in FIG. 4.

Figure 9:
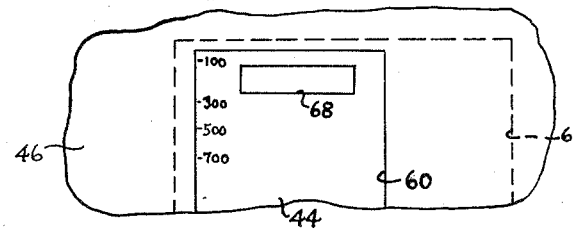
FIG. 9 is a fragmentary view illustrating a portion of an insert card used in the FIG. 4 instrument.

In some cases, as for example the cyclone type, it is advantageous to provide more than one card for the entire gas volume range handled by the collector. Thus, one card might be used for the c.f.m. range from 200 to 1,000. Another might cover the range from 1,000 to 4,000. A third might cover the range from 4,000 to 10,000. The usefulness of the instrument is enhanced when working with cyclone collectors if the exposed part of window 68 is larger than appears in FIG. 4. Window 68 is located on card 44 in a position offset from the axis or centerline defined by the transverse slideway so that reversal of the card to the FIG. 9 position causes the entire window to be exposed. This arrangement facilitates the optimum selection of cyclone size options.

It will be noted from the drawing that card 12 has its numerals arranged so that it is impossible for the numerals to appear in the wrong windows. Thus, referring to FIG. 4, the gas volume numerals 61 are spaced upwardly from the collector size numerals so that the gas volume numerals can only register with window 58 and the collector size numerals can only register with window 68. Similarly, referring to the back of the instrument as shown in FIGS. 5 and 8, windows 74, 78, 76 and 80 are vertically staggered or offset so that the numerals in the two collection factor scales cannot appear in either of the collector efficiency windows, and the efficiency numerals cannot appear in either of the correction factor windows 74 or 76.

It will be appreciated that the invention is not limited to the exact details of construction illustrated in the drawings. For example, the temperature, pressure drop, and specific gravity scales can be transposed while still retaining the essential features of the instrument. If desired each card 42 can be provided with blanks for the identity of the salesman or customer, and additional blanks for expected operating conditions. The customer or salesman can then fill out the blanks and send the card to the dust collector manufacturer for verification of the selection. Preferably holder 40 and card 44 are of stiff material so that the user of the instrument can mark the outlines of the various windows 100, 68, 74, 76, 78 and 80 on card 42 for verification of results while the card is in each of its adjusted positions in the holder.

What is claimed is:

1. A dust collector selector comprising a holder having parallel front and back walls, and intervening wall structure cooperating therewith to define a longitudinal slideway and a transverse slideway; said front wall having a cut-away area and a gas volume indicator window; said rear wall having a correction factor determination window, a correction factor collector capacity comparison window, and a collector efficiency determination window; at least one main insert member adapted to be slidably disposed in the longitudinal slideway for adjustment therein; each main insert member having a front face and a rear face; the front face of each main insert member having a scale of gas volume numerals arranged to register with the gas volume window in the holder, and a column of collector size numerals for each gas volume numeral arranged to register with the aforementioned cut-away area; the rear face of each main insert member having a first scale of correction factor numerals viewable through the correction factor determination window, a second scale of correction factor numerals viewable through the correction factor-collector capacity comparison window, and a scale of collector efficiency numerals viewable through the efficiency determination window; and an auxiliary insert member adapted to be slidably positioned in the transverse slideway for viewing through the aforementioned cut-away area; said auxiliary insert member and holder front wall having cooperating pressure drop and temperature graduations arranged to register with one another, said auxiliary insert member having a collector size window arranged to expose the collector size numerals on the front face of the main insert member; the rear face of said main insert member and the rear face of the holder having cooperating temperature and specific gravity scales arranged to register with one another to determine the correction factor; and the rear face of the holder having gas volume graduations arranged to register with the second scale of correction factor numerals for determining the efficiency numerals viewable through the efficiency determination window.

2. A dust collector selector comprising a holder having parallel front and back walls, and intervening wall structure cooperating therewith to define a longitudinal slideway and a transverse slideway; said front wall having a cut-away area and pressure drop graduations adjacent thereto, and a gas volume window; said rear wall having a correction factor determination window and temperature gradutions adjacent thereto, a correction factor-collector capacity comparison window and collector capacity graduations adjacent thereto, and a collector efficiency determination window; at least one main insert member adapted to be slidably disposed in the longitudinal slideway for adjustment therein; each main insert member having a front face and a rear face; the front face of each main insert member having a scale of gas volume numerals arranged to register with the gas volume window in the holder, and a column of collector size numerals for each gas volume numeral arranged to register with the aforementioned cut-away area; the rear face of each main insert member having specific gravity numerals and correction factor numerals viewable through the correction factor determination window, correction factor numerals viewable through the correction factor-collector size comparison window, and collector efficinecy numerals viewable through the efficiency determination window; and an auxiliary insert member adapted to be slidably positioned in the transverse slideway for viewing through the aforementioned cut-away area; said auxiliary insert member having temperature graduations thereon arranged to register with the pressure drop graduations on the holder front wall, and a collector size window arranged for viewing the collector size numerals on the front face of the main insert member.

3. The combination of claim 2 wherein each column of collector size numerals is divided into two rows, one of which denotes numbers of collector tubes, and the other of which denotes gas volumes per tube.

4. The combination of claim 2 wherein the collector size window in the auxiliary insert member is offset from the centerline of the transverse slideway whereby in one position of the auxiliary member part of the window is masked by the holder front wall and in a reverse position of the auxiliary member the entire window is exposed.

5. A dust collector selector comprising a holder having parallel front and back walls, and intervening wall structure cooperating therewith to define a longitudinal slideway and a transverse slideway; said front wall having a cut-away area and a gas volume indicator window; at least one main insert member adapted to be slidably disposed in the longitudinal slideway for adjustment therein; each main insert member having a front face and a rear face; the front face of each main insert member having a scale of gas volume numerals arranged to register with the gas volume window in the holder, and a column of collector size numerals for each gas volume numeral arranged to register with the aforementioned cut-away area; and an auxiliary insert member adapted to be slidably positioned in the transverse slideway for viewing through the aforementioned cut-away area; said auxiliary insert member and holder front wall having cooperating pressure drop and temperature graduations arranged to register with one another, and said auxiliary insert member having a collector size window arranged to expose the collector size numerals on the front face of the main insert member.

References Cited by the Examiner

UNITED STATES PATENTS

| | | | |
|---|---|---|---|
| 1,253,562 | 1/18 | Appelbaum | 40—115 |
| 1,430,212 | 9/22 | Brabant | 40—109 |
| 1,974,901 | 9/34 | Stadler | 235—61 |
| 3,045,908 | 7/62 | Donovan | 235—89 |

FOREIGN PATENTS 756,144   8/56   Great Britain.

LEO SMILOW, *Primary Examiner*.